UNITED STATES PATENT OFFICE.

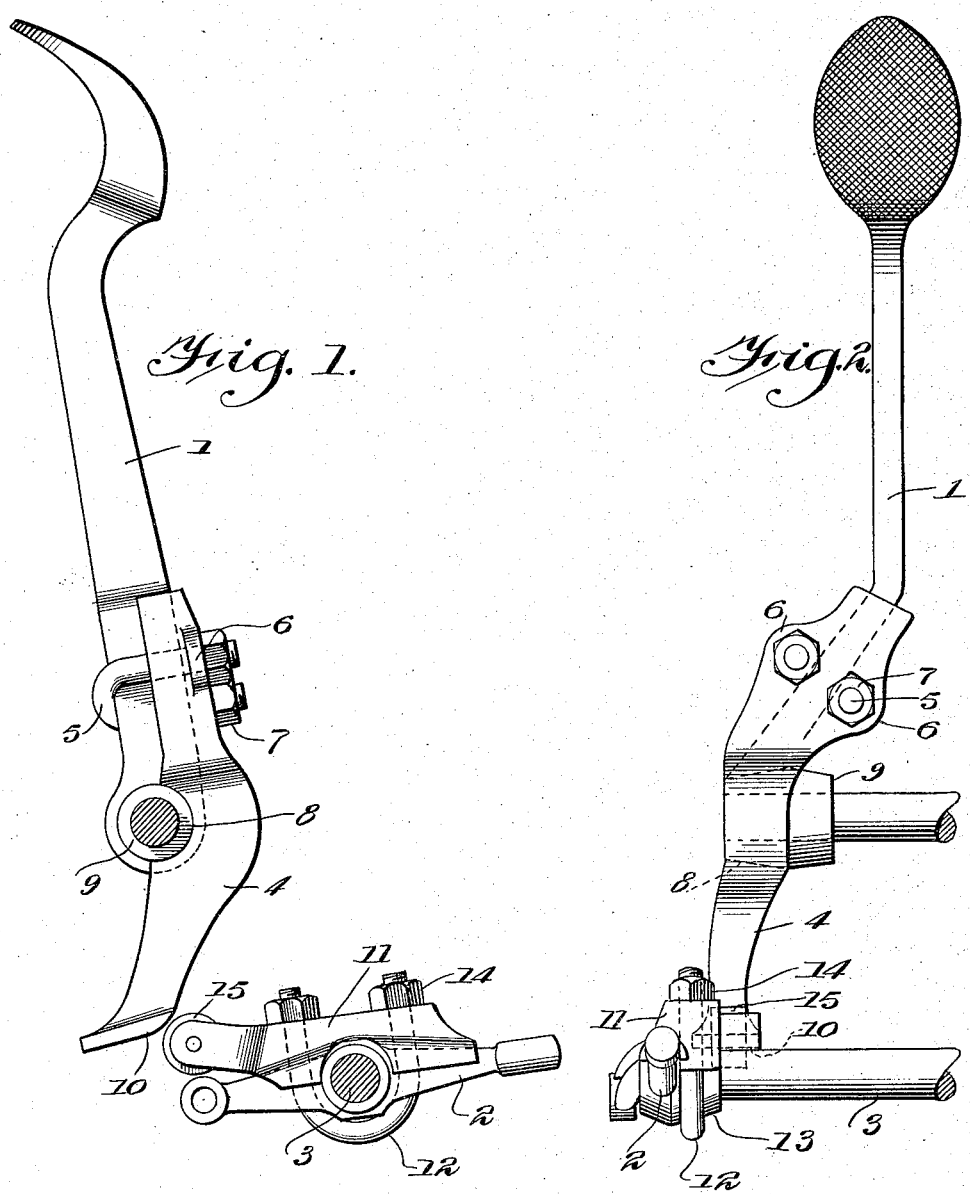

LAFAYETTE A. HAYS, OF MANCHESTER, NEW HAMPSHIRE.

CLUTCH-RELEASING MEANS FOR MOTOR-CARS.

1,167,171.	Specification of Letters Patent.	Patented Jan. 4, 1916.

Application filed February 13, 1915. Serial No. 8,108.

*To all whom it may concern:*

Be it known that I, LAFAYETTE A. HAYS, a citizen of the United States, residing at Manchester, in the county of Hillsboro and State of New Hampshire, have invented new and useful Improvements in Clutch-Releasing Means for Motor-Cars, of which the following is a specification.

This invention relates to clutch releasing means for motor cars, the object in view being to provide simple means whereby the brake pedal or lever which is ordinarily used to apply the brake, is adapted to coöperate with the clutch lever so that in applying the brake, the clutch is first released. By means of the construction hereinafter described, the necessity of first operating a clutch pedal and subsequently operating a brake pedal is overcome. Furthermore, by means of the present invention, the stalling of the engine is prevented, the same happening by reason of the fact that the brake pedal is applied before the clutch is released.

With the above and other objects in view, the invention consists in the novel construction, combination and arrangement of parts, as herein described, illustrated and claimed.

In the accompanying drawings:—Figure 1 is a side elevation of the brake pedal and clutch lever, showing the present invention applied thereto. Fig. 2 is a rear elevation of the same.

Referring to the drawings 1 designates the brake pedal now commonly employed in automobiles, the same having the ordinary brake connections, whereby when the pedal 1 is pressed upon, the brake or brakes are applied.

2 designates the ordinary clutch lever which is mounted on the shaft 3 controlling the clutch, so that when the lever 2 is rocked in the proper direction, the clutch is released.

In carrying out the present invention, I provide an arm 4 which is secured in fixed relation to the brake pedal 1 as shown in the drawings, the fastening means being shown as consisting of a U-shaped bolt or clip 5 which embraces the brake pedal and passes through oppositely extending ears 6 of the arm 4, the two ends of the member 5 being secured by nuts 7. The arm 4 is also shown as formed with a semi-cylindrical recess or seat 8 for the hub 9 of the brake pedal 1. It will thus be observed that the arm 4 has a rigid or fixed connection with the brake pedal. The lower end of the arm 4 is formed with a cam face 10 the purpose of which will presently appear.

Secured in fixed relation to the clutch lever 2 is an arm 11, the fastening means being shown in the form of a U-shaped bolt or clip 12 embracing the hub portion 13 of the clutch lever 2 and having the ends thereof inserted through the arm 11 and secured by means of nuts 14. At the projecting end of the arm 11, a roller 15 is journaled therein which is adapted to be operated upon by the cam face 10 of the arm 4 hereinabove described.

From the foregoing description, taken in connection with the accompanying drawings, the operation of the device will now be understood. When the operator presses on the brake pedal 1 to apply the brake and stop the machine, the cam face 10 of the arm 4 comes in contact with the roller 15 thereby operating the arm 11 and turning the shaft 3 on which the clutch lever 2 is mounted. Therefore, the clutch is first released, and this operation is immediately followed by the application of the brake or brakes. This avoids any possibility of stalling the engine by applying the brake when the clutch is in engagement and furthermore, requires only the use of a single lever instead of the two levers now commonly employed, one of which is usually termed the clutch lever and the other the brake lever.

It will be understood that instead of forming the arm 4 separately from the brake pedal 1 and instead of forming the arm 11 separately from the clutch lever 2, said arms may be formed integrally with their respective members 1 and 2.

The construction described is particularly set forth hereinabove as it enables the principle of this invention to be applied to machines already in use and requires no modification of the present brake pedals and clutch levers.

What I claim is:—

The combination with the clutch releasing lever of a motor car, of an extension arm, a roller carried by said extension arm, fastening means for securing said arm in fixed relation to said clutch releasing lever, a brake pedal, an extension arm for said pedal lever, and fastening means for securing the last named arm to said brake pedal, said arms coöperating in such manner that when pressure is exerted on the brake pedal the clutch is first released followed by the application of the brake.

In testimony whereof I affix my signature in presence of two witnesses.

LAFAYETTE A. HAYS.

Witnesses:
 JAMES S. CAVANAUGH,
 WILLIAM M. CAMPBELL.

Copies of this patent may be obtained for five cents each, by addressing the "Commissioner of Patents, Washington, D. C."